United States Patent [19]
Arnold

[11] 3,801,816
[45] Apr. 2, 1974

[54] WELL LOGGING SYSTEM AND METHOD

[75] Inventor: Dan McCay Arnold, Houston, Tex.

[73] Assignee: Texaco Inc., New York, N.Y.

[22] Filed: May 25, 1971

[21] Appl. No.: 146,708

[52] U.S. Cl. .................................. 250/270
[51] Int. Cl. .................................. G01v 5/00
[58] Field of Search.... 250/83.3 R, 83.6 W, 83.6 PS

[56] References Cited
UNITED STATES PATENTS

| | | | |
|---|---|---|---|
| 3,529,160 | 9/1970 | Moran | 250/83.6 W |
| 3,532,885 | 10/1970 | Youmans | 250/83.6 W |
| 3,486,025 | 12/1969 | Brinkerhoff | 250/83.3 R |
| 3,368,195 | 2/1968 | Peterson | 250/83.6 W |
| 3,465,151 | 9/1969 | Youmans | 250/83.6 W |
| 3,214,587 | 10/1965 | Monaghan | 250/83.6 W |

Primary Examiner—Walter Stolwein
Assistant Examiner—D. C. Nelms
Attorney, Agent, or Firm—Thomas H. Whaley; Carl G. Reis

[57] ABSTRACT

A radioactivity well logging system is provided for making both a conventional log and a novel spectral analysis of the activation-produced radiation during the same trip through the borehole. The neutron source is pulsed to provide successive irradiation and quiescent intervals, and the resulting radiation may be detected during the irradiation intervals to provide conventional measurements such as an N-gamma log. During each quiescent interval, and after the neutrons produced during the preceeding irradiation interval have disappeared, a spectral measurement is made of the radiation emitted by the unstable isotopes in the earth. The signals from a multichannel analyzer may further be examined by comparison with a predetermined composite spectrum assumed to relate to a predetermined particular lithology.

10 Claims, 4 Drawing Figures

WELL LOGGING SYSTEM AND METHOD

BACKGROUND OF INVENTION

This invention relates to well logging methods and apparatus for investigating the characteristics of subsurface earth formations and, more particularly, relates to improved radiological methods and apparatus for making a plurality of different lithological measurements during a single trip through the bore hole.

It is well known to drill boreholes into subsurface earth formations for the purpose of recovering oil and gas trapped in such formations, and it is further well known to log such boreholes for the purpose of determining the particular formations which contain such oil and gas. Most of the various types of measurements which are made during logging operations are intended to determine different lithological characteristics of such formations, whereby the likelihood that a particular formation contains oil or gas may be determined. Taken alone, however, no single measurement is sufficiently informative, and thus it is conventional to make various different measurements before arriving at any conclusion as to the fluid-bearing potential of a particular formation of interest.

For example, it is conventional to irradiate the subsurface earth materials around a borehole to create unstable isotopes therein and to make a spectral analysis of the secondary radiations generated by such unstable isotopes to determine the presence of preselected elements within such materials. It is also well known to irradiate the materials surrounding the borehole with neutrons which are scattered and captured in such materials and to measure the gamma radiation resulting from such scattering and capture to determine certain lithological characteristics such as the relative porosity of the formations. Further, it is conventional to measure the gamma radiation emanating from naturally radioactive earth materials traversed by the borehole and to employ such measurements to identify the presence of shale-type formations.

It is costly to log a borehole, especially since it is necessary to completely suspend all drilling and production operations during the logging operation, and lost rig time is frequently a greater expense than the cost of the logging service. Further, this expense is even greater when logging operations employing radiological techniques are sought to be performed, since logging of this type is usually required to be done at a slower speed than other logging techniques. Accordingly, it is preferable to simultaneously performed as many different types of lithological measurements as reasonably possible during the same trip through the borehole.

There are a number of practical considerations, however, which constitute a limitation on the making of certain radiological measurements at the same time. For example, if a neutron source is employed which is capable of activating the surrounding earth, such a source will also activate the sensitive portion of the radiation detector in the logging tool generating unwanted or "background" radiation which will, of course, be detected along with gamma rays produced by the scattering and capture reactions occuring in the irradiated earth materials. On the other hand, if a different detector is employed to sense the gamma rays produced by the scattering and capture reactions, and if this auxiliary detector is spaced far enough from the source to avoid being activated by the source, it will also detect the gamma rays naturally emitted by the earth.

From time to time, various logging techniques have been proposed for the purpose of making a plurality of different radioactivity measurements. For example, subsurface sondes have been constructed which have contained two or more different detectors which are each adapted to detect a different class of radiation and to thereby provide a plurality of different lithological indications. Although such an arrangement is not entirely without benefit, it should be noted that the detectors cannot be all located at the same depth in the well, and thus there is a disadvantageous lack of correlation between the measurements for this reason. Further, a sonde which is capable of carrying a plurality of spaced-apart detectors will be abnormally long and, therefore, difficult to pass through a crooked well bore.

The principal basis for determining the identity of the elements in question is the energy of the radiation emitted by the element in question. Thus, it has been proposed to use only a single detector, but to pass the output signal through a multichannel pulse analyzer or the like to provide a spectral analysis of the detected radiations. This has previously been impossible to do in the case of well logging measurements, however, since a radiation which originates at a higher energy is often degraded greatly by scattering events before it strikes the detector, and thus each segment of the signal will inevitably contain portions which are properly attributable to radiations other than those which are intended to be counted in a particular energy band.

These and other problems of the prior art are overcome with the present invention, however, and novel methods and apparatus are herewith provided for simultaneously deriving a plurality of preselected different indications of the materials surrounding a borehole.

SUMMARY OF INVENTION

In a preferred embodiment of the present invention, a well logging system is provided which is generally conventional in design and operation, but wherein a source of high energy neutrons is included which is capable of being selectively activated and inactivated. A single radiation detector is included for the purpose of the invention, which is preferably a scintillation counter having a thallium-activated crystal of sodium iodide or the like.

Gating apparatus may be included for the purpose of activating the neutron source for the first half, for example, of each 1-second interval of logging time and for inactivating the neutron source during the latter half-second. During each such half-second irradiation interval, the detector signal will be composed of pulses attributable to fast and slow neutron reactions, to gamma radiation emitted by unstable isotopes, and to gamma rays emitted by radioactive substances naturally present in the earth surrounding the borehole. The crystal itself will become radioactive, and thus the detector signal may preferably be passed through a suitable discriminator to eliminate this portion of the signal before it is transmitted to the surface.

During each irradiation interval prompt gamma radiation from fast and thermal reactions are predominantly detected by the detector. Accordingly, the portion of the detector signal which is received during each irradiation interval may be recorded in a conventional manner to provide a conventional neutron/gamma ray logging measurement.

It should be noted that "fast" neutrons (those with energies greater than 1 Mev.) will be slowed to epithermal and thermal energies within an extremely short time interval following inactivation of the neutron source. However, the resulting thermal neutrons will tend to linger in the formations and borehole for a relatively extended time interval after the neutron source has been turned off, and thus it is preferable to hold the detector inactive for a period following termination of the irradiation interval sufficient to permit the resulting capture-induced gamma radiation to decline to negligible proportion. After this extended period of inactivation or interruption of the detector signal, the detector signal may again be switched on for substantially the remainder of the 1-second operating cycle, and the detector signal is then preferably analyzed by a suitable multichannel pulse height analyzer to provide a lithological analysis of the formations.

During this latter detection interval, the radiations being sensed will substantially all be attributable to radiations emanating from unstable isotopes in the irradiated earth formations, natural radioactivity from the shales, and the activated crystal portion of the detector. The activation of the crystal results from the neutron-gamma reaction which transforms iodine-127 into the unstable isotope iodine-128. This unstable isotope has a half-life of 28 minutes, however, and since the emission is accordingly relatively steady in intensity, is sometimes merely treated as a constant "background" or even ignored if sufficiently less intense than the desired signal. Alternatively, the betas from the iodine-128 in the crystal may be eliminated by a discriminator trigger-level setting of 2.12 Mev.

Conventional practices such as these are unsuitable for the purposes of the present invention, however, since a high trigger-level setting of 2.12 Mev. will also effectively eliminate many radiations of particular interest, such as the 1.78 Mev. gamma rays occurring as a result of the silicon-28($n,p$) aluminum-28 reaction. Also, there are many other detected but unwanted radiations besides the 2.12 Mev. betas, which must be eliminated from any measurement which is intended to provide a useful lithological analysis of the earth materials, but which cannot be deleted merely by use of a pulse height discriminator. The reason for this is that although a particular gamma ray may have an initial energy which is indicative of its originating nucleus, the gamma may itself undergo one or more reactions such as Compton scattering before it is detected. Since there will be a loss of energy each time the gamma is scattered, the terminal energy of the gamma will often bear little direct relationship to its origin by the time it is detected. Thus, most of the detected gamma rays which originated at 6 Mev. from excited oxygen-16 nuclei (nitrogen-16), for example, may arrive at the detector at various terminal energies which are well below the 6 Mev. level.

In a suitable embodiment of the present invention, a measurement is made which is initially exclusive of all N-gamma radiation, but which is then corrected for the presence of the unwanted gamma rays hereinbefore described by counting all radiations falling in each of several adjacent preselected energy ranges or "windows" of a conventional multichannel pulse height analyzer. After indications are obtained for the count rate for each window, the count rate for the window encompassing the lowest energy band may be corrected according to predetermined relationship by use of the counts obtained from each of the other higher energy windows of the analyzer.

To further illustrate the concept of this feature of the present invention, assume a plurality of four different windows of preferably adjacent energy bands as follows:

Window No. 1 — A-energy band
Window No. 2 — B-energy band (immediately below the A-band)
Window No. 3 — C-energy band (immediately below the B-band)
Window No. 4 — D-energy band (immediately below the C-band)

wherein the lower limit of the A-band is also the upper limit of the B-band, the lower limit of the B-band is also the upper limit of the C-band, and wherein the lower limit of the C-band is also the upper limit of the D-band. Accordingly, these four windows will effectively cover the energy spectrum lying between the upper limit of the A-band and the lower limit of the D-band. The techniques described herewithin do not necessarily require that the energy bands be adjacent.

Assume that the isotope M sought to be detected and measured will produce radiations having an initial energy which is within the D-energy band established by window No. 4. Assume also, however, that there are three other classes of similar radiation N, O, and P, which have initial energies lying within the energy bands C, B, and A, respectively. If these are the only radiations which are detected (or assumed to be detected), it will be apparent that the signal from window No. 1 will be attributable only to P-type radiation. Since a substantial number of the P-radiation actually detected will have first experienced a greater or lesser loss of energy, however, it will also be apparent that only a portion of the radiation detected for window No. 2 will be attributable to O-type radiation, and that the signal will also include a significant component which is attributable to degraded P-radiation.

In the same manner, only a portion of the output signal for window No. 3 may be attributable to detected N-type radiations. Instead, the window No. 3 signal will also include detection components attributable to degraded O-radiation and also to further degraded P-type radiation.

Accordingly, only a portion of the radiation detected with terminal energy within the D-band may be attributable to excited M-type nuclei. Instead, the signal from window No. 4 will include N, O and P-radiation components, as well as the M-component which is actually sought to be measured.

The relationships hereinbefore described may be better understood by the following equations:

$$C_1 = C_{1,P}$$
$$C_2 = C_{2,P} + C_{2,O}$$
$$C_3 = C_{3,P} + C_{3,O} + C_{3,N}$$
$$C_4 = C_{4,P} + C_{4,O} + C_{4,N} + C_{4,M}$$

wherein $C_1$ through $C_4$ are the counting rates for the radiations indicated by the signals from windows No. 1—4, respectively. Each of the counting rates $C_{1-4}$ is made up of one or more signal components defined as $C_{i,j}$. The subscript $i$ refers to the window in which the signal is recorded and the subscript $j$ refers to the type of excited nucleus emitting the radiation.

Referring to $C_4$, it will be apparent that $C_{4,M}$ cannot be determined unless $C_{4,P}$, $C_{4,O}$, and $C_{4,N}$ are also capable of determination. Also, the number or count-rate $C_{2,P}$, the P-radiations detected with the B-energy band, is not necessarily the same as $C_{1,P}$, the measured count rate of the P-radiations which are detected in the A-energy band. Nor is the P-radiation component $C_{4,P}$ in the D-energy band necessarily the same as $C_{3,P}$, the P-radiation count rate in the C-energy band.

It will be noted, however, that (by definition) only P-radiations are present within the A-energy band. Furthermore, $C_{2,P}$ will be proportional to $C_{1,P}$, and $C_{4,P}$ will be proportional to $C_{3,P}$. If these proportions can be determined, then the magnitude of $C_{2,P}$ can be determined from a determination of $C_{1,P}$, and the magnitude of $C_{2,O}$ can be determined by subtracting $C_{2,P}$ from $C_2$.

If $C_{2,P}$ is proportional to $C_1$, then it necessarily follows that $C_{3,O}$ is also proportional to $C_{2,O}$, and that $C_{4,O}$ is also proportional to $C_{3,O}$. Similarly, $C_{4,N}$ will also be proportional to $C_{3,N}$.

As hereinbefore stated, however, it is the magnitude of $C_{4,M}$ which is the information sought to be obtained, and that this information cannot reliably be derived merely from the signals $C_{1-4}$ alone. The relative proportions of $C_{3,P}$ to $C_{1,P}$, etc., are affected mainly by the response of the logging instrument to a given type (P, N, O, etc.) of radiation and, to a lesser extent, the geometry of the sonde within the borehole. However, the geometry of the instrument can be standardized, and the importance of the borehole geometry to the measurement can be minimized with boxsprings and the like which will maintain the logging instrument in a preselected position within the casing or other production conduit within the borehole. Accordingly, the principal factors affecting the relative proportions of $C_{3,P}$ to $C_{1,P}$, etc., can be standardized or minimized and these constants of proportionality can be determined for each radiation of interest. Accordingly, the relationships governing the signals to be obtained from windows No. 1–4 of the analyzer may be restated as follows:

$$C_1 = C_{1,P}$$
$$C_2 = k_1 C_{1,P} + C_{2,O}$$
$$C_3 = k_2 C_{1,P} + k_3 C_{2,O} + C_{3,N}$$
$$C_4 = k_4 C_{1,P} + k_5 C_{2,O} + k_6 C_{3,N} + C_{4,M}$$

where $$k_1 = C_{2,P} / C_{1,P}$$
$$k_2 = C_{3,P} / C_{1,P}$$
$$k_3 = C_{3,O} / C_{2,O}$$
$$k_4 = C_{4,P} / C_{1,P}$$
$$k_5 = C_{4,O} / C_{2,O}$$
$$k_6 = C_{4,N} / C_{3,N}$$

Once $k_{1-6}$ have been determined, it will be apparent that it is a relatively simple matter to compute the magnitude of the M-radiation component sought to be determined.

It is also a feature of the present invention to establish preseleted norms for these different components. Conventional couter techniques and apparatus may then be employed to analyze the signals $C_{1-4}$ for the purpose of providing a comprehensive review of the lithology of the earth materials traversed by the borehole.

These and other features and advantages of the present invention will become apparent from the following detailed description, wherein reference is made to the figures in the accompanying drawings.

IN THE DRAWINGS

DETAILED DESCRIPTION

Figure 1:
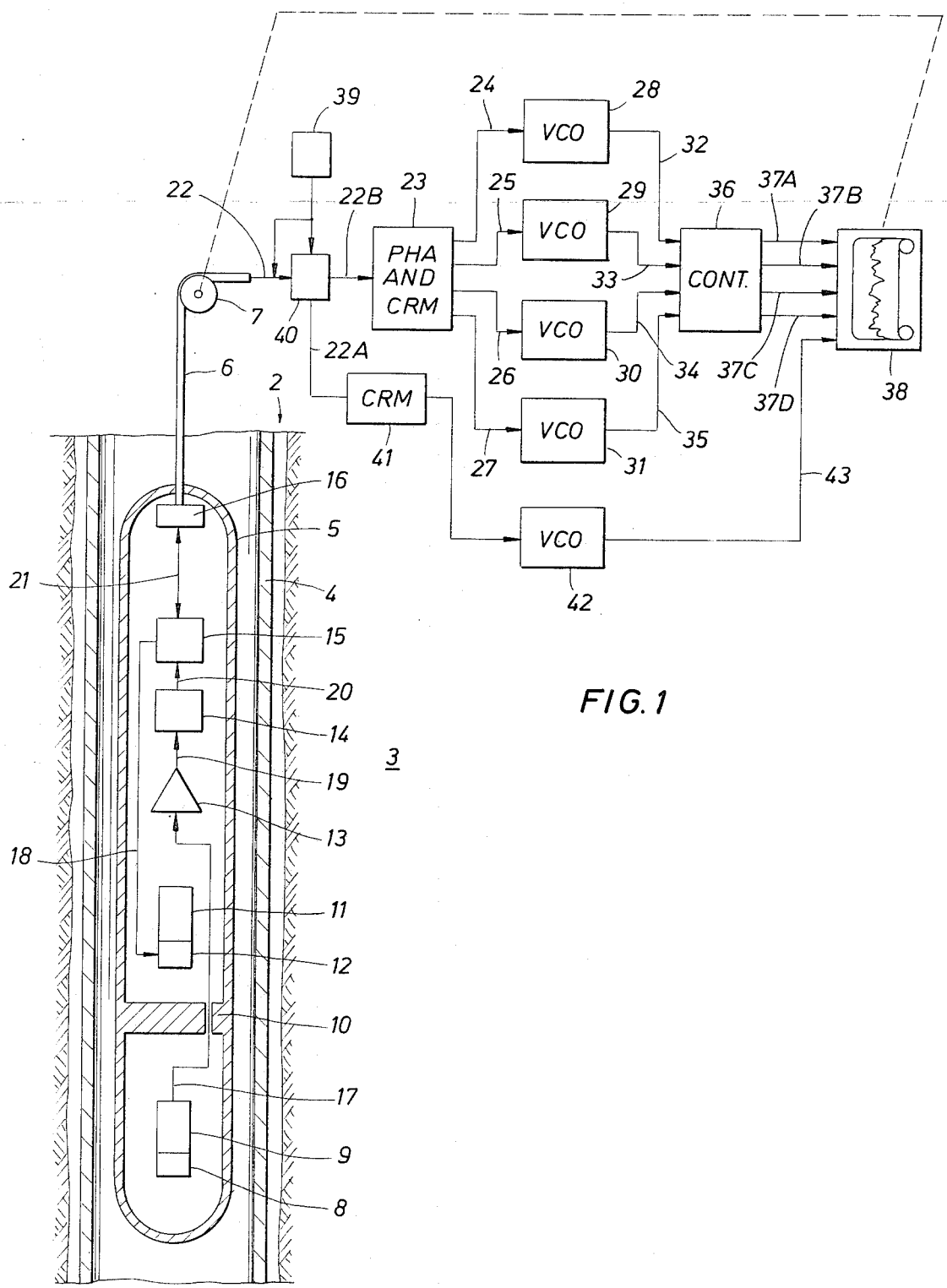
FIG. 1 is a simplified, partly functional and partly pictorial representation of the principal sections of a well logging system suitable for practicing the concept of the present invention.

Referring now to FIG. 1, there may be seen a simplified functional representation of a typical borehole 2 in the earth 3, which is lined in a conventional manner with a steel casing 4 or the like, and which further contains a portion of a well logging system arranged and adapted to investigate preselected characteristics of adjacent portions of the surrounding earth 3. More particularly, the logging system may be seen to be basically composed of an elongated hollow body or sonde 5 which is adapted to be passed longitudinally through the casing 4, instrumentation located at the surface for processing and recording electrical measurements provided by the sonde 5, and a conventional logging cable 6 adpated to support the sonde 5 in the borehole 2 and having one or more conductors for transmitting electrical signals between the sonde 5 and the aforementioned apparatus at the surface.

Referring again to FIG. 1 and to the sonde 5 depicted therein, a source of high energy neutrons such as a static atmosphere deuterium-tritium accelerator 11 may be located at a suitable position within the sonde 5 for bombarding the contents of the borehole 2 and adjacent regions of the earth 3, and a suitable radiation detector may be included for detecting gamma rays resulting from such bombardment. As hereinbefore stated, it is an object of the present invention to measure radiation produced by the decay of certain preselected unstable isotopes in the earth 3. Accordingly, the detector is preferably located in the sonde 5 below the accelerator 11, and is also preferably a thallium-activated crystal 8 of sodium iodide or the like which is optically coupled to a photomultiplier tube 9 of suitable design. In addition, a radiation shield 10 of suitable composition is preferably interposed between the accelerator 11 and the crystal 8 to prevent or reduce direct irradiation of the crystal 8 by the accelerator 11.

As is well known in the art, it is a function of the crystal 8 to produce a discrete flash of light whenever a gamma ray is "stopped" by the crystal 8, and it is a function of the photomultiplier tube 9 to generate a voltage pulse in response to each scintillation which it "sees" in the crystal 8. As is further well known in the art, each scintillation which occurs in the crystal 8 is functionally related in intensity to the energy of the captured radiation which it absorbs, and thus each voltage pulse generated by the photomultiplier tube 9 will generally have an amplitude which is a function of the terminal energy of the corresponding radiation particle which has been detected.

The pulses which are produced by the photomultiplier tube 9 will accordingly constitute the detector signal 17. As indicated in FIG. 1, many of the pulses in the detector signal 17 may be relatively small, and thus it is conventional to pass the detector signal 17 to an amplifier 13.

The detector signal 17 may be expected to include a great many pulses other than the pulses which represent the radiations sought to be detected, however. For example, the photomultiplier tube 9 will usually itself generate spurious signals, and although these are usually of a relatively low amplitude there are also usually a great many such noise pulses. In addition, the crystal 8 may be expected to be struck by neutrons from the accelerator 11 which are scattered in the borehole 2 and earth 3, and which thereafter return to the borehole 2 to strike the crystal 8. Accordingly, the crystal 8 will itself become "activated" due to $I^{127}$ $(n, \gamma I^{128}$ reactions, and will produce scintillations in response to the resulting 2.12 Mev. beta emissions.

The iodine-128 ihe crystal 8 has a half-life of approximately 28 minutes, and the noise component of the detector signal 17 is even more constant in intensity. Accordingly, this portion of the detector signal 117 is often treated as a constant "background" or ignored for the reason that, in most logging measurements, it is the fluctuation in count rate which is of particular interest.

It is also conventional, however, to eliminate spurious or other unwanted components of the detector signal 17, however, even in those instances wherein a qualitative measurement of the earth characteristics is sought to be made. Accordingly, as also indicated in FIG. 1, the output signal 19 from the amplifier 13 may be applied to an integral discriminator 14 having its "trigger" circuit (not depicted) set at an appropriate level. In the present invention, the trigger level of the discriminator 14 may be 2.12 Mev., whereby the amplified detector signal 19 may be stripped of all pulses attributable to activation of the crystal 8 as well as those pulses corresponding to noise in the photomultiplier tube 9.

As hereinbefore stated, it is a feature of the present invention that the formations in the earth 3 be irradiated intermittently rather than constantly. Accordingly, the accelerator 11 is preferably connected to a pulsing circuit 12 of conventional design, and a suitable gating circuit 15 may also be included in the sonde 5 for appropriately actuating the pulsing circuit 12 according to whatever sequence may be desired.

As also hereinbefore stated, the signals which are intended to be derived from the sonde 5 are intended to be employed to provide a time-dependent measurement of one or more preselected characteristics of the earth 3 traversed by the borehole 2. In a suitable embodiment of the invention, therefore, the discriminated detector signal 20 may be applied to the gating circuit 15 which, in conjunction with the actuation of the accelerator 11, operates to pass only time-discriminated or time-dependent segments 21 of the discriminated detector signal 20 which it receives. For example, on one operating sequence which has been found particularly suitable for purposes of the present invention, the gating circuit 15 is arranged to generate a "turn-on" signal 18 during the first 500 milliseconds of each 1-second operating cycle, and to discontinue such signal 18 during the latter 500 millisecond portion of each such discrete 1-second cycle. Thus, the pulsing circuit 12 responds to these "turn-on" signals to cause the accelerator 11 to produce neutrons only during the first half of each 1-second of logging time.

In such a logging sequence, it is convenient to make a conventional neutron-gamma ray log, and this may be done by having the gating circuit 15 "open" during the existence of each such half-second "turn-on" signal 18, whereby the time-dependent detector signal 21 will be composed of discrete groups of pulses, and whereby each such pulse group will be consistent in occurrence and duration with the occurrence and duration of the corresponding irradiation intervals.

Upon termination of each such half-second irradiation interval, the neutrons which are then present in the section of the borehole 2 and earth 3 adjacent the accelerator 11 and crystal 8 will tend to slow down and ultimately engage in capture reactions with the nuclei of the earth 3, the casing 4, the fluids in the borehole 2, and even in the structure of the sonde 5. After an appropriate interval such as 10 milliseconds, however, this neutron "population" may be expected to have disappeared or declined to negligible proportions, and the gamma radiation which is thereafter sensed by the crystal 8 may be assumed to be composed substantially of only the 2.12 Mev. beta emission in the activated crystal 8, gamma radiation from radioactive materials such as thorium and uranium which occur naturally in shale, and gamma radiation resulting from decay of the various unstable isotopes created in the earth 3, the casing 4 and the borehole 2 by the bombarding neutrons produced by the accelerator 11. Accordingly, the gating circuit 15 may further be arranged and adapted to again "open" during an appropriate portion of the latter half of each 1-second operating cycle, and the time-dependent detector signal 21 may also be caused to include other discrete groups of pulses having a different significance.

As hereinbefore stated, the trigger level of the discriminator 14 may be set so as to eliminate all pulses attributable to detector circuit noise and to beta emission in the activated crystal 8. Accordingly, the pulse group which is passed by the gating circuit during each period when the accelerator 11 is quiescent may, for purposes of the present invention, be attributed entirely to either naturally occurring gamma radiation or to gamma rays from excited nuclei within the vicinity of the detector crystal 8.

Referring again to FIG. 1, it may be seen therein that the time-dependent detector signals 21 may conveniently be applied to the logging cable 6 by means of a conventional cable connector circuit 16 for transfer to the surface of the earth 3. Accordingly, the surface end of the cable 6 may be connected to the input of another gate 40 which is actuated in synchronism with the gating circuit 15 in the sonde 5 to divide the incoming discriminated and time-dependent groups 22 of pulses from the cable 6 into a first measurement signal 22A which includes only the groups of pulses representing radiations detected by the crystal 8 during activation of the accelerator 11, and into a second measurement signal 22B which is composed of only the groups of pulses representing radiations detected by the crystal 8 while the accelerator 11 is quiescent.

The surface gate 40 may be actuated in any of several conventional ways to keep it synchronized with the operation of the gating circuit 15 in the sonde 5. For example, the "turn-on" signal 18 which is applied to the pulsing circuit 12 in the sonde 5 may also be carried to the surface by the cable 6 and used to actuate the gate 40. Alternatively, a clock on other timing circuit 39 may be connected to both the gate 40 and the upper end of the cable 6, whereby each timing signal from the timing circuit 39 will simultaneously and synchronously cycle both the gate 40 at the surface and the gating circuit 15 in the sonde 5 at the same time.

As hereinbefore stated, the gamma radiation which is sensed by the crystal 8 during activation of the accelerator 11 is predominately composed of the gamma rays which result from scattering and capture of the neutrons. Accordingly, the measurement signal 22A may be applied to a conventional count rate meter 41 which will provide an output voltage which may be utilized to produce a conventional neutron-gamma ray log of the earth 3 surrounding the borehole 2. More particularly, the output voltage of the count rate meter 41 may, for certain purposes, be converted from an analog signal to a digital representation of the rate of occurrence of the neutron-gammas. For example, the output voltage from the count rate meter 41 may be connected to the gain of a conventional voltage-controlled oscillator 42, and the output frequency 43 from the oscillator 42 may then be applied to a suitable input of a conventional digitally operated chart recorder 38 or the like.

It is desirable, of course, that all logging measurements be recorded or generated in correlation with an indication of the depth at which the radiations creating the measurements were detected. This may be accomplished in any one of several conventional ways, however. For example, the recorder 38 may be driven by the rotation of a measuring or sheave wheel 7 which, in turn, is driven by the logging cable 6.

Referring again to FIG. 1, and to the gate 40 depicted therein, it will be apparent that the second measurement signal 22B is preferably coupled to the input of a multichannel pulse height analyzer 23 having an appropriate number of "windows," and further including count rate circuitry for generating a voltage which is functionally related to the number of counts in each window. As used herein, the term "window" means the signal channel which accommodates all pulses of greater than a certain preselected minimum amplitude, but not greater than a certain preselected maximum amplitude. As will hereinafter be explained, the first output signal 24 from the analyzer 23 may be a voltage from window No. 1, and which is proportional to the counting rate of all radiations detected during the quiescent portions of each operating cycle which have terminal energies greater than 2.50 Mev. but not greater than 2.85 Mev. Output signals 25 and 26, therefore, may be the voltages from windows No. 2 and No. 3, respectively, and may indicate the counting rates of radiations having terminal energies of 2.15 Mev. to 2.50 Mev., and 1.95 Mev. to 2.15 Mev., respectively. Output signal 27 from window No. 4, on the other hand, may be a voltage proportional to the counting rate of radiations detected with terminal energies of less than 1.95 Mev. but greater than 1.60 Mev.

It will be apparent that the energy ranges of windows No. 3 and No. 4 are all below the 2.15 Mev. setting of the trigger level of the discriminator 14 as previously described. As will hereinafter be explained, there are many radiations with energies less than 2.15 Mev. which are of significance in any measurement which is directed to the lithology of the earth 3, and which will nevertheless be excluded from the measurement if the trigger level is set high enough to eliminate the beta emission in the activated crystal 8. Accordingly, in the embodiment of the present invention which is hereinafter described in detail, the trigger level of the discriminator 14 may be assumed to be set at a level which is sufficient to eliminate the noise pulses generated in the photomultiplier tube 9, but which is nevertheless not greater than the lowest energy gamma ray sought to be counted. In this example, then, the trigger level will not be greater than 1.60 Mev.

Referring again to FIG. 1, there may be seen to be included apparatus for converting the analog-type signals 24–27 into digital form. This may be accomplished in any of several different conventional ways, as by coupling each voltage 24–27 to a different one of a corresponding number of voltage-controlled oscillators 28–31 which provide frequencies 32–35 which are functionally related to the corresponding ones of the output voltages 24–27.

The output frequency 43 representing the conventional neutron-gamma ray log may be processed by the recorder 38 in a conventional manner. The output frequencies 32–35, however, are preferably passed to the recorder 38 by way of a suitable calculator or controller 36, or the like, which is programmed according to the relationship hereinbefore described to derive a measurement of the lithological constituent sought to be observed.

Assuming that the four windows of the pulse height analyzer 23 have been set to establish the four energy bands hereinbefore described; i.e., 2.50–2.85 Mev., 2.15–2.50 Mev., 1.95–2.15 Mev., and 1.60–1.95 Mev., it will be apparent that the present invention can easily and conveniently be employed to provide an indication of the amount of silicon in the adjacent earth 3. More particularly, signals 32–35 will constitute digital representations of the count rates to be derived from windows No. 1–4, respectively, and thus these four signals may be restated according to the following relationships as hereinbefore explained:

$$C_1 = C_{1,Th}$$
$$C_2 = k_1 C_{1,Th} + C_{2,U}$$
$$C_3 = k_2 C_{1,Th} + k_3 C_{2,U} + C_{3,I-128}$$
$$C_4 = k_4 C_{1,Th} + k_5 C_{2,U} + k_6 C_{3,I-128} + C_{4,Si}$$

wherein the subscripts Th and U refer to the thorium and uranium which occurs naturally in the earth, wherein the subscript I—128 identifies the unstable isotope produced in the crystal 8, and wherein the subscript Si refers to the silicon-28 which is transformed into the unstable isotope aluminum-28 by the bombarding neutrons from the accelerator 11. These signals 32–35 are applied to appropriate inputs of the digital controller 36 which, as hereinbefore explained, has been programmed to substitute predetermined values for $k_{1-6}$, as hereinbefore explained, in order to derive a recordable indication for the silicon in the adjacent earth 3.

Although the computation of silicon has involved only four windows of the pulse height analyzer 23, it will be readily apparent that many different elements may be determined at the same time by the concepts of the present invention, whereby a detailed spectral analysis of the earth 3 may be obtained during a single trip through the borehole 2. This will become more apparent when it is realized that, in the immediately proceeding example, the signal 24 from window No. 1 was only presumed to be composed entirely of radiation from the naturally occurring thorium. In actual practice, it cannot be presumed with absolute finality that the radiation in any given energy band is ever composed of only radiation from any one specific source. For example, it has heretofore been stated that the neutrons from an accelerator 11 of the type hereinbefore stated to be preferred will have initial energies of 14.4 Mev. It is well known that the threshold energy of the oxygen-16 $(n,p)$ nitrogen-16 reaction is well below 14.4 Mev., and since there is a great deal of oxygen-16 in the earth 3, it will be clearly apparent that much of the gamma radiation terminating in the crystal 8 can be fairly attributable to the unstable isotope nitrogen-16. Accordingly, the count obtained from window No. 1 must, in accuracy, actually be attributed at least partially to gamma rays emitted by this nitrogen-16.

The relative intensity of the recorded signals from all types of activation reactions can be controlled to a certain extent by adjusting the source to detector spacing and the logging speed. As an example, the relative intensity of nitrogen -16 (half-life of 7 sec) from $O^{16}$ $(n,p)$ $N^{16}$ to aluminum -28 (half-life of 2-3 minutes) from $Si^{28}$ $(n,p)$ $Al^{28}$ can be decreased by increasing the source-detector spacing and decreasing the logging speed. If the chosen source to detector spacing and logging speed are such that $N^{16}$ is produced in significant quantities, then it is merely required that an additional window be established to provide an output signal for a higher band of radiation energies sufficient to encompass the oxygen gammas hereinbefore mentioned. The counting rates recorded within the original four lower energy bands would then be corrected for contributions from $N^{16}$ using the same general techniques described hereinbefore. Since the analyzer 23 may have as many as 400 or more "windows," this will permit the identification and determination of almost any unstable isotope having a half-life which is at least as long as the 1-second operating cycle of the system. Accordingly, the controller 36 may be programmed to apply a plurality of such indications 37A-D to the recorder 38 as suggested in FIG. 1.

Figure 2:
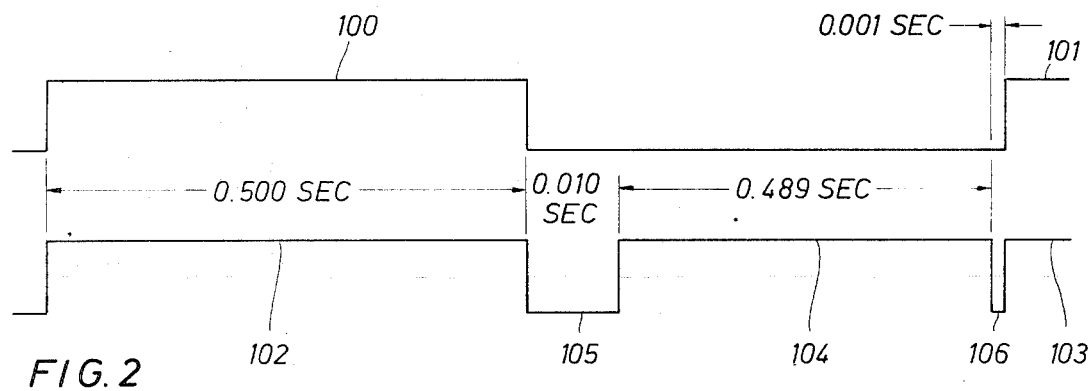
FIG. 2 is a diagrammatic and time dependent representation of an exemplary operating sequence for the apparatus depicted generally in FIG. 1.

Referring now to FIG. 2, there may be seen a simplified pulse diagram illustrating the operating sequence hereinbefore described with respect to the system depicted in FIG. 1, wherein the borehole 2 is irradiated for a substantial portion of each operating cycle. More particularly, the accelerator 11 is activated during an irradiation interval 100 constituting the first half or 500 microsecond portion of each 1 second of system operation, and is held quiescent during the latter 500 microsecond portion thereof. The detector signal 20 may be "passed" to the surface during a first detection interval 102, and if the irradiation interval 100 and first detection interval 102 are substantially coincident, it will be apparent that this "passed" portion of the detector signal 20 will constitute a conventional neutron-gamma logging measurement.

The so-called fast neutron population created in and around the borehole 2 during the irradiation interval 100, will tend to decline to negligible proportions almost as soon as the irradiation interval 100 is completed, and this is the reason it is preferable to terminate the first detection interval 102 substantially coincidently with termination of the irradiation interval 100. The thermal neutron population which appears in place of the short-lived fast neutron population will, however, tend to disappear over a much longer time period. If detection of capture-induced gamma rays is to be avoided during the following detection interval, therefore, the gating circuit 15 must be kept closed for a substantial interval following termination of the irradiation interval 100. As indicated in FIG. 2, a suitable delay interval 105 of about 10 milliseconds in duration has been found to be adequate for purposes of the present invention.

After the delay interval 105 has expired, the gating circuit 15 may again be "opened" for a secondary detection interval 104 which preferably extends through substantially the balance of the 500 millisecond quiescent interval which extends between the two irradiation intervals 100 and 101. Although it is preferable for statistical purposes to provide for a secondary detection interval 104 of a maximum duration, it is also preferable to terminate this secondary detection interval 104 about 1 millisecond before the next irradiation and primary detection intervals 101 and 103 occur. Accordingly, this establishes a discrete interval 106 which, in the detector signal 20 will more precisely define the limits of the detection intervals 104 and 103.

It will thus be apparent that the pulses which constitute the signal 21 during the primary detection interval 102 of each 1 second of system operation, may be routed by the gate 40 to the count rate meter 41 depicted in FIG. 1. Accordingly, it is the pulses which constitute the signal 21 during the secondary detection interval 104, which are routed by the gate 40 to the pulse height analyzer 23.

Figure 3:
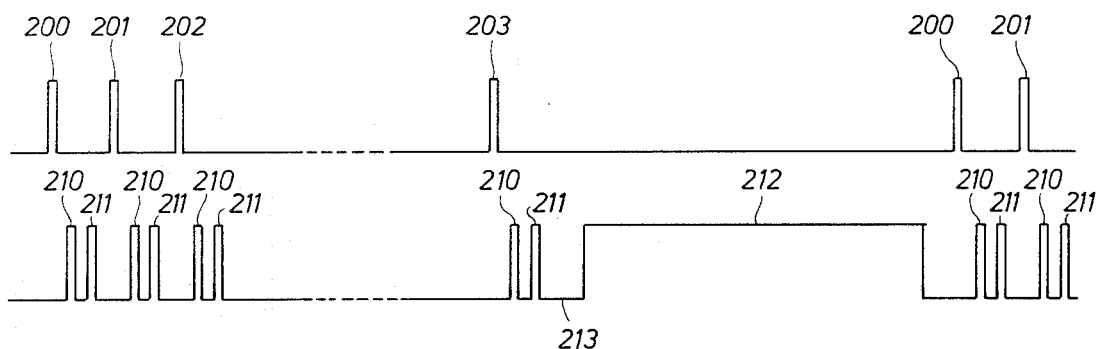
FIG. 3 is a diagrammatic and time dependent representation of another suitable operating sequence for the apparatus depicted generally in FIG. 1.

Although it is a desirable feature of the present invention to make a plurality of different and perhaps unrelated lithological measurement during the same trip through the borehole 2, it will be apparent that it is also possible to make a measurement other than a conventional neutron-gamma log during the so-called primary detection interval 102 depicted in FIG. 1. For example, it is entirely within the concept of the invention to cause the accelerator 11 to emit neutrons in sharp discrete bursts, and to determine the rate of decline of the thermal neutron population resulting from each of such bursts. Referring now to FIG. 3, therefore, there may be seen a pulse diagram depicting pulsed actuation of the accelerator 11 at 1-millisecond intervals to produce a series of discrete neutron bursts 200–203 of perhaps 30–35 microseconds duration each, and to produce such bursts 200–203 during a suitable irradiation interval which may constitute the initial half of each 1-second operating cycle. Accordingly, it is convenient, then, to cause the gating circuit 15 to pass two discrete time-dependent portions 210 and 211 of the detector signal 20 following the termination of each of the neutron bursts 200–203, and to route these pairs of pulse groups to appropriate counting and ratio-taking circuitry of conventional design.

The sequence of bursts 200–203 of fast neutrons will, of course, effectively activate suitable portions of the crystal 8, the surrounding earth 3, and the contents of the borehole 2, to substantially the same extent as when the accelerator 11 was activated as depicted in FIG. 2, depending on the speed with which the sonde 5 is lifted through the borehole. Accordingly, after termination of the last neutron burst 203 in the irradiation interval of each 1-second operating cycle, the gating circuit 15 may again be opened for a suitable secondary detection interval 212, the same as hereinbefore explained with respect to FIG. 2.

It is well known, of course, that gamma rays originate in the excited nuclei of atoms, and that they represent the energy difference between the initial excited state and a lower energy state which may or may not be the ground level. In other words, there may exist several possible energy levels between the initial and the ground states, and because of this fact a given nucleus of a particular preselected type may emit a gama having almost any of a wide range of initial energies.

Nevertheless, in the case of a particular nucleus which is in its initial excited state, there is usually a distinct probability that the gamma emitted by that nucleus will have one of only a very few predetermined initial energies. In other words, if the radiation emitted by only a single isotope is examined, a linear representation of count rate as a function of energy will tend to depict one or more characteristic "peaks," and it is these "peaks" on the curve which are of interest insofar as the present invention is concerned.

Figure 4:
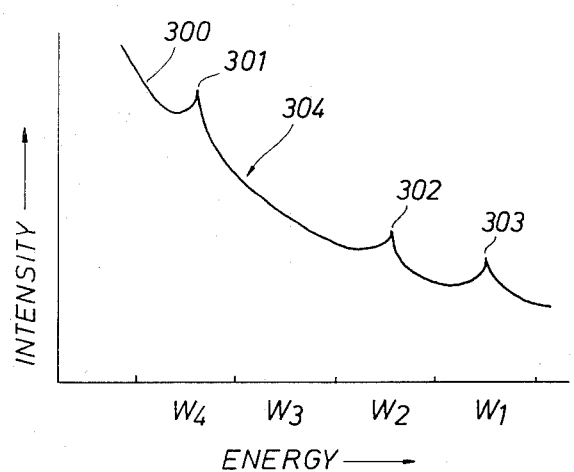
FIG. 4 is a simplified graphic representation of a typical energy distribution of radiations detected by means of the apparatus depicted generally in FIG. 1.

Referring now to FIG. 4, there may be seen an extremely simplified and stylized representation of the counting rate which will presumably be obtained from an examination of a radiation "cloud" which is composed of only gamma rays emitted by thorium, uranium and aluminum-28, and the beta emission provided by the iodine-128 in the crystal 8. For purposes of this explanation, it may further be assumed that the windows of the pulse height analyzer 23 have been set to define the energy bands hereinbefore described, i.e., window No. 1 defines a band of 2.50–2.85 Mev., window No. 2 defines the band 2.15–2.50 Mev., window No. 3 defines the band 1.95–2.15 Mev., and window No. 4 defines the band 1.60–1.95 Mev.

Referring now to the curve 300 which represents the count rate to be obtained throughout the energies covered by the four windows, it may be seen that there will be a peak 301 in the band covered by window No. 4 which may be attributed to the gamma rays which predominately originate from the aluminum-28 nuclei, since the gamma radiation from this isotope is known to peak at 1.78 Mev. Accordingly, it will be noted that this peak 301 is substantially the midpoint between the limits of the energy band defined by window No. 4.

It is well known that thorium has an extremely complex spectrum insofar as its gamma radiation is concerned. Nevertheless, for purpose of illustration it is assumed in FIG. 4 that there is a characteristic peak 303 at about 2.68 Mev., which is the midpoint between the limits of window No. 1.

It will be noted that no attempt has been made in FIG. 4 to depict a peak on the portion 304 of the curve 300 which is within window No. 3. This, of course, is because it is well known that no detectable peak structure exists with respect to the beta emission provided by the iodine-128 nuclei in the crystal 8. If the limits of window No. 3 are set as hereinbefore specified, however, a count will be obtained which is entirely adequate for the purposes of the present invention.

In all cases where the characteristic peak is known, it will nevertheless be advantageous to establish the width of the appropriate window, whereby the window is broad enough to provide an adequate count of the radiation sought to be counted, but also so that the characteristic peak, if any, is substantially at the midpoint of the band defined by the window in question. As a further example of this feature, it will be noted that the peak 302 which is depicted as midway within the band defined by window No. 2, may thereby be assumed to represent a significant peak of about 2.32 Mev. for the gamma radiation emitted by one of the daughter products of the U—238 decay series.

Various modifications and changes can be made in the structures and techniques hereinbefore described and explained without significantly departing from the concepts of the present invention. Accordingly, it will be clearly understood that the processes and apparatus hereinbefore described and referred to are exemplary only, and do not constitute limitations on the subject invention.

What is claimed is:

1. The method of radioactivity well logging, comprising bombarding subsurface earth materials with fast neutrons only during a discrete irradiation time interval whereby said materials emit gamma radiations resulting from the creation of unstable isotopes and the occurrence of inelastic neutron scattering or thermal neutron captures by materials in the vicinity of the well borehole, detecting said resulting gamma radiations during a first detection interval substantially coincident with said irradiation interval, detecting said resulting gamma radiations during a second detection time interval following the termination of said irradiation interval by an increment of time sufficient to allow substantially all of the thermal neutron capture events to die away, measuring said gamma radiations detected during said irradiation interval as a function of the occurrence of thermal neutron capture processes in said bombarded earth materials, and measuring said gamma radiations detected during said second detection interval as a function of substantially only said creation of unstable isotopes in said bombarded earth materials.

2. The method described in claim 1, further comprising establishing electrical pulses for said detected radiations, forming selected groups of said pulses into time-dependent electrical signals, and selecting and measuring one of said pulse groups as a function of substantially only said creation of unstable isotopes in said bombarded earth materials.

3. A method of radioactivity well logging, comprising bombarding subsurface earth materials with high energy neutrons during a discrete irradiation interval, interrupting such bombardment during a quiescent interval which commences with the termination of said irradiation interval and which extends at least until said neutrons are substantially all captured, during a first detection interval which begins and terminates during said irradiation interval detecting gamma radiation resulting from inelastic neutron scattering or thermal neutron capture in said bombarded earth materials, establishing an electrical detection signal composed of pulses functionally related in occurrence and amplitude to the occurrence and terminal energy of a selected portion of said gamma radiations detected during said irradiation and quiescent intervals, selecting a first time-dependent portion of said detection signal and forming said first portion into a recordable representation of the occurrence of thermal neutron capture reactions in said bombarded earth materials, selecting a second time-dependent portion of said detection signal and forming said second portion into a recordable representation of the creation of said unstable isotopes in said bombarded earth materials, and making an energy-dependent analysis of said second portion of said signal for determining the part of said second portions which is substantially attributable to those of said detected radiations which are emitted by the nuclei of a preselected one of said unstable isotopes.

4. The method described in claim 3, wherein said analysis further includes establishing a plurality of amplitude bands each relating functionally to a different radiation energy range, grouping pulses in said second portion of said second detection signal according to said amplitude bands, and counting the number of pulses in each of said groups.

5. The method described in claim 4, wherein said analysis further includes establishing said amplitude bands as a function of the original energies of a corresponding number of predetermined different kinds of excited nuclei, and grouping said pulses according to said different energies.

6. The method described in claim 5, further including deriving from said pulse groups an electrical representation of the composite spectrum of said different kinds of excited nuclei, and comparing said derived electrical representation with a representation of a predetermined standard composite.

7. A method of radioactivity well logging, comprising bombarding a subsurface earth formation with neutrons during a first predetermined discrete irradiation interval, detecting a representative portion of the gamma rays resulting from such bombardment and emanating from said formation during said irradiation interval, thereafter detecting a representative portion of the gamma rays resulting from said bombardment and emanating from said formation after said irradiation interval and during a predetermined quiescent interval, counting said gamma rays detected during said irradiation interval, counting those of said gamma rays detected during said quiescent interval and having an energy within a first predetermined energy range attributable to a first preselected element in said formation, counting those of said gamma rays detected during said quiescent interval and having an energy within a second lower predetermined energy range attributable to a second preselected element in said formation, determining the proportion of said first element in said formation as a function of the number of gamma rays detected during said quiescent interval and having an energy within said first range, and determining the proportion of said second element in said formation as a function of the number of gamma rays detected during said quiescent interval and having an energy within said second range less a first correction factor proportional to the number of said gamma rays counted in said first energy range.

8. The method described in claim 7, further comprising counting those of said gamma rays detected during said quiescent interval and having an energy within a third energy range lower than said second range and attributable to a third preselected element in said formation, and determining the proportion of said third element in said formation as a function of the number of gamma rays detected during said quiescent interval and having an energy within said third range less the sum of a second correction factor proportional to the number of said gamma rays counted in said first energy range and a third correction factor proportional to the difference between said number of gamma rays counted in said second energy range and said first correction factor.

9. The method described in claim 8, further comprising counting those of said gamma rays detected during said quiescent interval and having an energy within a fouth energy range lower than said third energy range and attributable to a fourth preselected element in said formation, and determining the proportion of said fourth element in said formation as a function of the number of gamma rays detected during said quiescent interval and having an energy within said fourth range less the sum of a fourth, fifth and sixth correction factor respectively proportional to a function of the sum of said first, second and third factors.

10. The method described in claim 9, further comprising establishing a plurality of predetermined values functionally corresponding respectively to the proportions of said first, second, third and fourth elements in an average subsurface earth formation of a predetermined type and character, and comparing each of said determined proportions of said elements in said bombarded formation with a corresponding one of said predetermined values.

* * * * *